(12) United States Patent
Kono et al.

(10) Patent No.: US 11,638,929 B2
(45) Date of Patent: May 2, 2023

(54) POWDER SUPPLY DEVICE

(71) Applicant: SEIKO EPSON CORPORATION, Tokyo (JP)

(72) Inventors: Taiki Kono, Nagano (JP); Shogo Nakada, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 17/456,451

(22) Filed: Nov. 24, 2021

(65) Prior Publication Data
US 2022/0168774 A1    Jun. 2, 2022

(30) Foreign Application Priority Data

Nov. 27, 2020    (JP) .............................. JP2020-197297

(51) Int. Cl.
| | | |
|---|---|---|
| *B05C 11/10* | (2006.01) | |
| *B65G 65/40* | (2006.01) | |
| *B05C 5/02* | (2006.01) | |

(52) U.S. Cl.
CPC ............ *B05C 11/10* (2013.01); *B05C 5/0245* (2013.01); *B65G 65/40* (2013.01)

(58) Field of Classification Search
USPC .......................................................... 222/410
See application file for complete search history.

(56) References Cited

U.S. PATENT DOCUMENTS

| | | | | | |
|---|---|---|---|---|---|
| 3,620,423 | A | * | 11/1971 | Dalgleish ........... | B65G 65/4881 118/308 |
| 4,350,269 | A | * | 9/1982 | Hanada ................ | G01F 13/005 222/DIG. 1 |
| 4,492,321 | A | * | 1/1985 | Zoltner ................... | G01F 11/24 222/548 |
| 4,733,267 | A | * | 3/1988 | Enoki ................ | G03G 15/0862 399/273 |

(Continued)

FOREIGN PATENT DOCUMENTS

| | | | | | |
|---|---|---|---|---|---|
| EP | 469902 | A | * | 2/1992 | ......... G03G 15/0806 |
| EP | 666516 | A1 | * | 8/1995 | ......... G03G 15/0822 |

(Continued)

*Primary Examiner* — Paul R Durand
*Assistant Examiner* — Michael J. Melaragno
(74) *Attorney, Agent, or Firm* — Global IP Counselors, LLP

(57) ABSTRACT

Provided is a powder supply device including a storage tank in which an internal space that stores powder and a discharge port that discharges the powder from the internal space to outside are formed, a roller that has an outer peripheral surface formed of a rough surface and is rotatably provided, in the discharge port, to face both the internal space and the outside, and a doctor blade that is provided at the discharge port and faces the outer peripheral surface of the roller. The internal space includes a first chamber into which the powder is charged and a second chamber in which the doctor blade is disposed. The first chamber communicates with the second chamber via an opening. A partition member that (Continued)

restricts the width of the opening is provided between the first chamber and the second chamber. The powder charged into the first chamber moves to the second chamber through the opening.

4 Claims, 5 Drawing Sheets

(56) References Cited

U.S. PATENT DOCUMENTS

| | | | | |
|---|---|---|---|---|
| 5,769,276 A * | 6/1998 | Alexander | ................ | B05B 3/02 222/196 |
| 6,236,825 B1 * | 5/2001 | Takeuchi | ............ | G03G 15/101 399/237 |
| 2002/0009308 A1 * | 1/2002 | Shoji | ................. | G03G 21/0064 399/150 |
| 2006/0029430 A1 * | 2/2006 | Hosoya | ................. | G03G 15/11 399/249 |
| 2007/0065183 A1 * | 3/2007 | Tomita | ............... | G03G 15/0874 399/258 |
| 2007/0231013 A1 * | 10/2007 | Hasdai | ................... | G03G 15/10 399/241 |
| 2007/0292165 A1 * | 12/2007 | Hirayama | ......... | G03G 15/0815 399/267 |
| 2008/0069598 A1 * | 3/2008 | Murakami | ........ | G03G 15/0194 399/265 |
| 2008/0170896 A1 * | 7/2008 | Kubota | ............. | G03G 15/2025 399/340 |
| 2009/0311004 A1 * | 12/2009 | Naruse | ................. | G03G 15/161 399/101 |
| 2010/0003058 A1 * | 1/2010 | Hori | ................... | G03G 15/0812 399/284 |
| 2010/0028792 A1 * | 2/2010 | Otake | ................. | G03G 9/0823 430/105 |
| 2011/0171571 A1 * | 7/2011 | Kim | ................... | G03G 9/08795 430/105 |
| 2011/0311278 A1 * | 12/2011 | Onoda | ............... | G03G 15/0887 399/281 |
| 2013/0130022 A1 * | 5/2013 | Uesugi | ...................... | B32B 9/00 428/447 |
| 2013/0156474 A1 * | 6/2013 | McGuire | ................ | G03G 5/005 399/346 |
| 2013/0259551 A1 * | 10/2013 | Liu | .................... | G03G 21/0094 399/346 |
| 2014/0286674 A1 * | 9/2014 | Mitsui | ................. | B41M 5/0356 399/130 |
| 2015/0255778 A1 * | 9/2015 | Orisaka | ..................... | B05C 9/12 29/746 |
| 2021/0080866 A1 * | 3/2021 | Sugihara | ........... | G03G 15/0877 |
| 2022/0128930 A1 * | 4/2022 | Kono | ................. | G03G 15/0822 |
| 2022/0168774 A1 * | 6/2022 | Kono | ..................... | B05C 19/04 |

FOREIGN PATENT DOCUMENTS

| | | | | |
|---|---|---|---|---|
| JP | 2012-228639 A | | 11/2012 | |
| JP | 2022069066 A | * | 5/2022 | ......... G03G 15/0822 |
| JP | 2022085555 A | * | 6/2022 | ............. B05C 11/10 |
| WO | WO-2011080922 A1 | * | 7/2011 | ......... G03G 15/0928 |
| WO | WO-2013065244 A1 | * | 5/2013 | ............... C09D 5/24 |
| WO | WO-2016002139 A1 | * | 1/2016 | ........ H01M 10/0525 |

* cited by examiner

POWDER SUPPLY DEVICE

The present application is based on, and claims priority from JP Application Ser. No. 2020-197297, filed Nov. 27, 2020, the disclosure of which is hereby incorporated by reference herein in its entirety.

BACKGROUND

1. Technical Field

The present disclosure relates to a powder supply device.

2. Related Art

A powder supply device that supplies powder by spraying the powder onto an object has been known. For example, the device described in JP-A-2012-228639 includes a powder storage tank that stores powder, a spray roller that is provided in the powder storage tank, and a doctor blade in close contact with the spray roller. The spray roller is formed to have an uneven surface. When the spray roller rotates, the powder adhering to the uneven surface is scraped off by the spray roller and drops from a supply port of the powder storage tank. As a result, the powder is supplied to an object located below the storage tank.

However, in the configuration described above, supplying the powder quantitatively may be difficult. More specifically, the powder in the powder storage tank applies a load to the doctor blade. As a result, the doctor blade may be curved, for example, and thus an excessive amount of powder may drop from the supply port.

SUMMARY

According to an aspect of the present disclosure, a powder supply device includes a storage tank in which an internal space that stores powder and a discharge port that discharges the powder from the internal space to outside are formed, a roller that has an outer peripheral surface formed of a rough surface and is rotatably provided, in the discharge port, to face both the internal space and the outside, and a doctor blade that is provided at the discharge port and faces the outer peripheral surface of the roller, in which the internal space includes a first chamber into which the powder is charged and a second chamber in which the doctor blade is disposed, the first chamber communicates with the second chamber via an opening, a restricting portion that restricts the width of the opening is provided between the first chamber and the second chamber, and the powder charged into the first chamber moves to the second chamber through the opening.

DESCRIPTION OF EXEMPLARY EMBODIMENTS

Hereinafter, a powder supply device of the present disclosure will be described in detail based on preferred embodiments illustrated in the accompanying drawings.

First Embodiment

Figure 1:
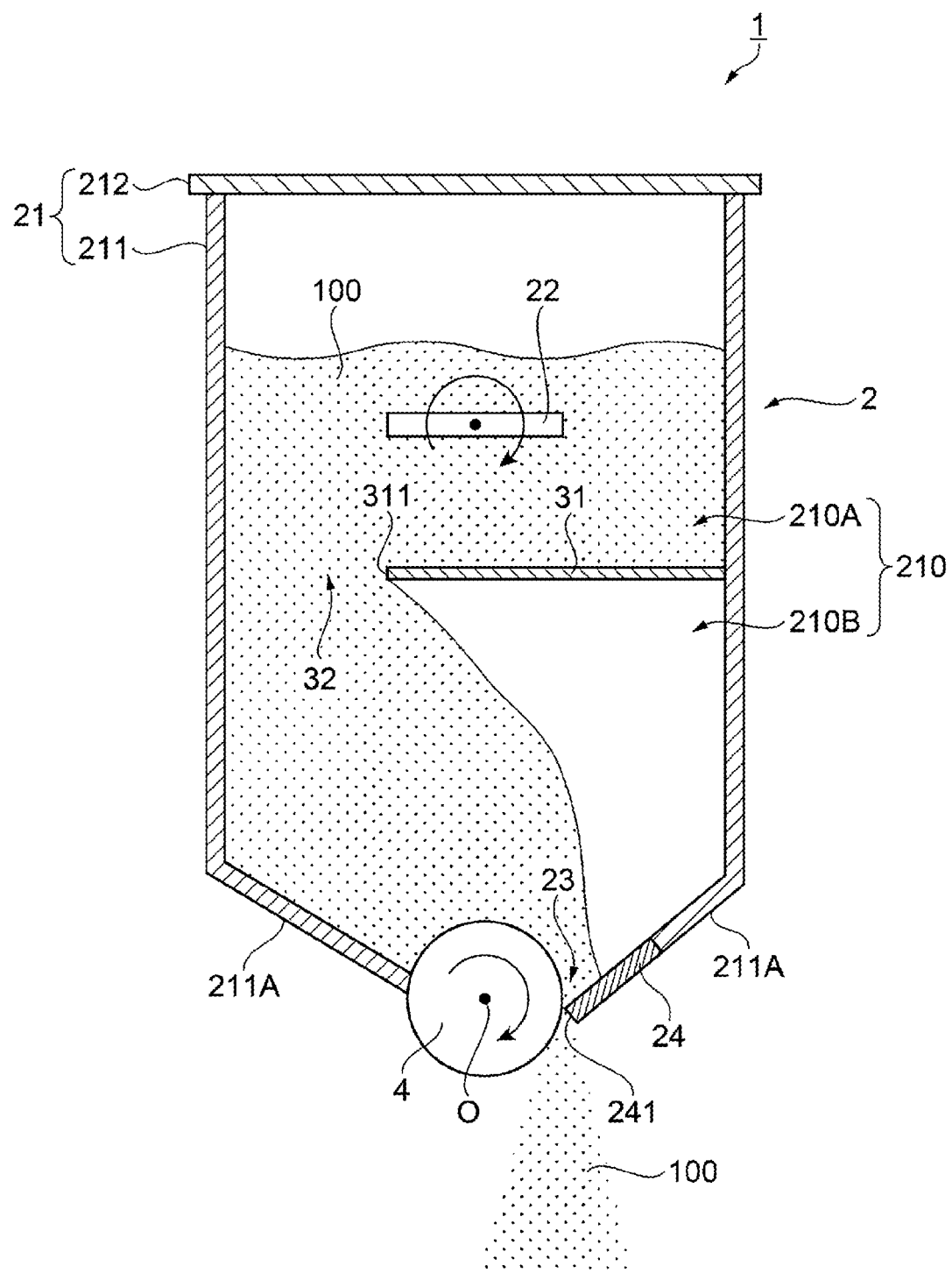
FIG. 1 is a sectional view of a powder supply device according to a first embodiment.
Figure 2:
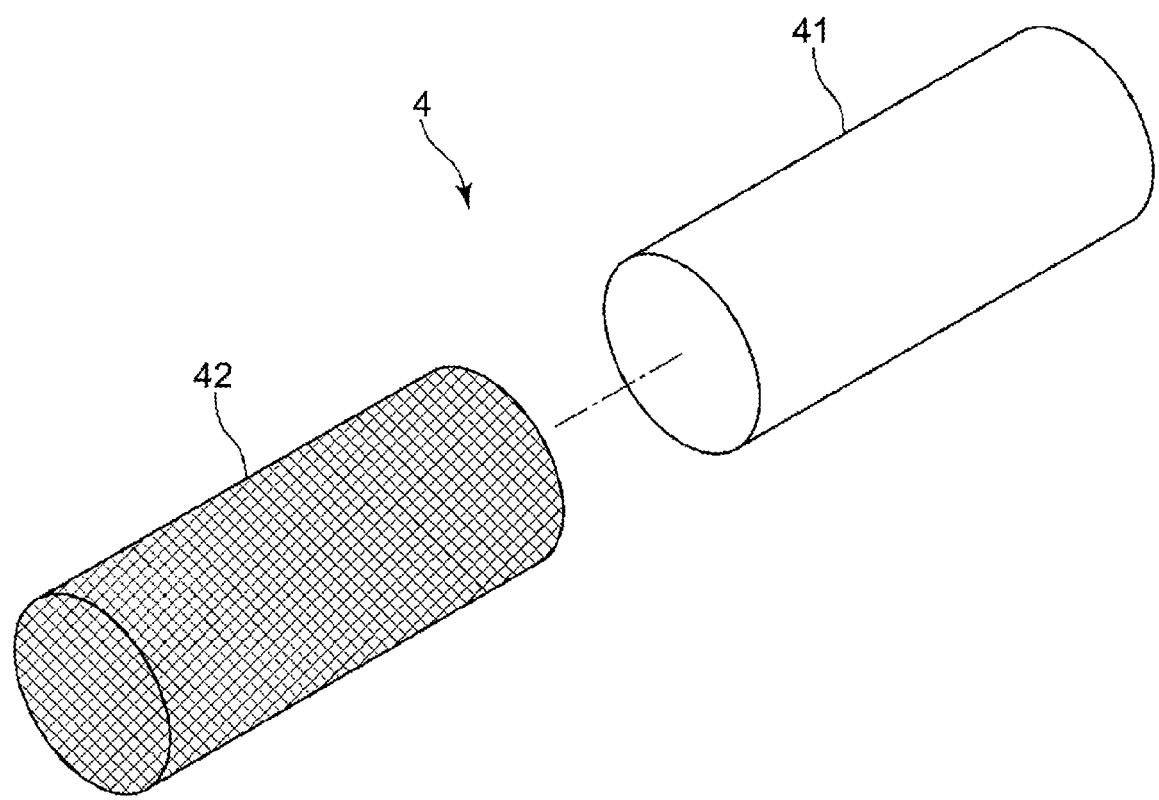
FIG. 2 is an exploded perspective view of an example of a roller.
Figure 3:
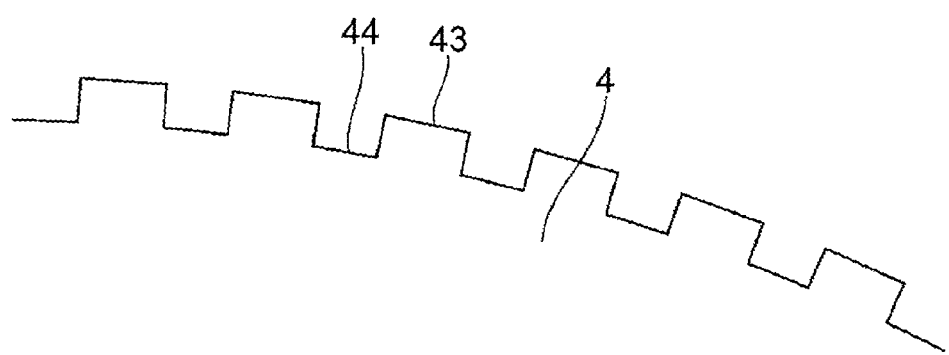
FIG. 3 is a partial enlarged view of an example of the roller.

FIG. 1 is a sectional view of a powder supply device according to a first embodiment of the present disclosure. FIG. 2 is an exploded perspective view of an example of a roller. FIG. 3 is a partial enlarged view of an example of the roller.

Note that hereinafter, for convenience of explanation, an upper side in FIG. 1 is referred to as up or upward, a lower side in FIG. 1 is referred to as down or downward. Note that in the drawings, the upper side is an upper side in a vertical direction, and the lower side is a lower side in the vertical direction.

As illustrated in FIG. 1, a powder supply device 1 includes storage 2 that stores powder 100, and a roller 4. The powder supply device 1 supplies the powder 100 by spraying the powder 100 onto an object (not illustrated) located below the roller. The powder supply device 1 can be used, for example, as a device that supplies powder over a sheet, which is an object, when winding up or laminating the sheet, for example.

The storage 2 includes a storage tank 21, a stirring unit 22, a doctor blade 24, and a partition member 31 serving as a restricting portion. In addition, the storage tank 21 includes a cylindrical side wall portion 211 and a lid portion 212 that is provided so as to close an opening above the side wall portion 211. The side wall portion 211 and the lid portion 212 form an internal space 210 for storing the powder 100.

In the present embodiment, the side wall portion 211 is a square cylinder. However, the present disclosure is not limited to this configuration, and the side wall portion 211 may be, for example, a circular cylinder, a triangular cylinder, a polygonal cylinder, or the like. In the present embodiment, the lid portion 212 is provided so as to be opened or closed through sliding. By opening the lid portion 212, it is possible to charge the powder 100 into the internal space 210 of the storage tank 21 from above the powder supply device 1.

On a lower side of the side wall portion 211, on left and right sides in FIG. 1, inclined portions 211A inclined such that a distance from each other decreases in a downward direction are formed. In addition, at lower ends of the inclined portions 211A, a discharge port 23 for discharging the powder 100 in the internal space 210 to the outside is formed. At the discharge port 23, the doctor blade 24 described later is provided.

The powder 100 is appropriately selected according to its use, and examples include a resin material, an inorganic material, a metal material, a naturally derived material, and the like. One or a combination of two or more selected from these materials may be used.

The resin material is not particularly limited. Examples of the resin material include AS resin, ABS resin, polyolefin such as polyethylene, polypropylene, and ethylene-vinyl acetate copolymer, modified polyolefin, acrylic resin such as polymethyl methacrylate, polyvinyl chloride, polystyrene, polyester such as polyethylene terephthalate and polybutylene terephthalate, polyamide such as nylon 6, nylon 46, nylon 66, nylon 610, nylon 612, nylon 11, nylon 12, nylon 6-12, and nylon 6-66, polyphenylene ether, polyacetal, polyether, polyphenylene oxide, polyether ether ketone, polycarbonate, polyphenylene sulfide, thermoplastic polyimide, polyether imide, a liquid crystal polymer such as aromatic polyester, various thermoplastic elastomers such as styrene-based, polyolefin-based, polyvinyl chloride-based, polyurethane-based, polyester-based, polyamide-based, polybutadiene-based, trans-polyisoprene-based, fluororubber-based, and chlorinated polyethylene-based thermoplastic elastomers, and a polymer having a base on side chains, and the like, and one or a combination of two or more selected from these materials may be used.

The inorganic material is not particularly limited. Examples of the inorganic material include silica such as crystalline silica, amorphous silica, and fused silica, aluminum hydroxide, magnesium hydroxide, calcium carbonate, magnesium carbonate, calcium silicate, magnesium silicate, calcium oxide, magnesium oxide, zinc oxide, alumina, aluminum nitride, aluminum borate whiskers, boron nitride, antimony oxide, E glass, D glass, S glass, zeolite, and the like.

The metal constituent is not particularly limited. Examples of the metal constituent include various metal materials such as nickel, iron, aluminum, tin, lead, chrome, cobalt, gold, and silver, metal alloys, metal oxides, carbon, graphite, and the like.

The naturally derived material is not particularly limited. Examples of the naturally derived material include starch, cellulose, cotton, lint, kapok, flax, hemp, ramie, silk, and the like.

The minimum average particle diameter of the powder 100 is not particularly limited, but is preferably 1 µm or more, is more preferably 150 µm or more, and is further more preferably 300 µm or more. In addition, the maximum average particle diameter of the powder 100 is not particularly limited, but is preferably 1000 µm or less, is more preferably 800 µm or less, and is further more preferably 500 µm or less.

Note that as the average particle diameter of the powder 100, for example, a particle size mean volume diameter (MVD) of a volume average measured by a particle size distribution measuring device using a laser diffraction and scattering method as a measurement principle, that is, a laser diffraction particle size distribution measuring device, can be used. With the laser diffraction particle size distribution measuring device, a particle distribution can be measured on a volume basis. Note that the shape of the powder 100 is not particularly limited and may be any shape such as a spherical shape, a scale-like shape, a needle-like shape, and the like.

The stirring unit 22 is an elongated plate-shaped member. The stirring unit 22 is disposed above the roller 4 in the internal space 210. The stirring unit 22 rotates around a horizontal central axis passing through the center of the stirring unit 22 in a longitudinal direction thereof to stir the powder 100 in the internal space 210. This can prevent or suppress lumps from forming in the powder 100. Furthermore, the stirring unit 22 can promote feeding of the powder 100 to the vicinity of the roller 4. As a result, a discharge amount of the powder 100 from the discharge port 23 can be made more consistent.

A rotation direction of the stirring unit 22 is not particularly limited, but is preferably the same as a rotation direction of the roller 4. As a result, the powder 100 on the partition member 31 can be efficiently fed toward the discharge port 23.

The roller 4 is provided so as to be fitted in the discharge port 23 and is rotatably provided to face both the internal space 210 and the outside. The roller 4 rotates, for example, clockwise with respect to a paper surface around a horizontal central axis O, as a rotation axis, extending in a direction perpendicular to the paper surface in FIG. 1. That is, in the internal space 210, the outer peripheral surface of the roller 4 moves from the left to the right in FIG. 1. In addition, the roller 4 has a shape elongated in a direction along the central axis O.

The roller 4 is coupled to a motor (not illustrated), and when the motor is energized, rotation power output by the motor is transferred to the roller 4, as a result of which the roller 4 rotates. Note that a configuration in which the rotation direction of the roller 4 and a rotation speed of the roller 4 may be adjusted by changing energizing conditions of the motor may be adopted.

The outer peripheral surface of the roller 4 is a rough surface having unevenness. Therefore, the powder 100 in the internal space 120 adheres to the rough surface of the roller 4, and some of the powder 100 enters a recess. Then, as the roller 4 rotates, the powder 100 adhering to the roller 4 moves from the left to the right in FIG. 1. Note that hereinafter, in the internal space 210, the left side of FIG. 1 is referred to as upstream in a transfer direction of the powder 100, and the right side of FIG. 1 is referred to as downstream in the transfer direction of the powder 100.

Surface roughness Rz of the outer peripheral surface of the roller 4, which is measured in accordance with JIS B 0601, is preferably 10 or more and 1000 or less, is more preferably 100 or more and 900 or less, and is further more preferably 150 or more and 750 or less. By setting the surface roughness of the outer peripheral surface of the roller 4 to be in a range of the above described numerical values, a particle having a relatively large particle diameter, such as a particle having a particle diameter of 300 µm or more, can be accommodated between a protrusion and a recess of the rough surface, and the powder 100 can be effectively and quantitatively sprayed more appropriately. When the surface roughness Rz is excessively small, it is difficult to quantitatively spray the particles of the powder 100 that are relatively large. On the other hand, when the surface roughness Rz is excessively large, it is difficult to quantitatively spray the particles of the powder 100 that are relatively small.

When an average particle diameter D of the powder 100 is 100 µm or more and less than 300 µm, the surface roughness Rz of the outer peripheral surface of the roller 4 is preferably 10 or more and 700 or less. As a result, when the average particle diameter D of the powder 100 is in a range of the above described numerical values, effects of the present disclosure can be more reliably obtained.

When the average particle diameter D of the powder 100 is 300 µm or more and less than 500 µm, the surface roughness Rz of the outer peripheral surface of the roller 4 is preferably 30 or more and 900 or less. As a result, when the average particle diameter D of the powder 100 is in a range of the above described numerical values, effects of the present disclosure can be more reliably obtained.

Furthermore, when the average particle diameter D of the powder 100 is 500 µm or more and less than 800 µm, the surface roughness Rz of the outer peripheral surface of the roller 4 is preferably 50 or more and 1200 or less. As a result, when the average particle diameter D of the powder 100 is in a range of the above described numerical values, effects of the present disclosure can be more reliably obtained.

In addition, the rotation speed of the roller 4 is not particularly limited, but is preferably 1 rpm or more and 600 rpm or less, and is more preferably 5 rpm or more and 300 rpm or less. As a result, it is possible to ensure a sufficient discharge amount and to effectively and quantitatively spray the powder 100 more appropriately.

In addition, a ratio Rz/D of the surface roughness Rz of the outer peripheral surface of the roller 4 to the average particle diameter D of the powder 100 is preferably 0.05 or more and 1000 or less, and is more preferably 0.1 or more and 100 or less. As a result, it is possible to ensure a sufficient discharge amount and to effectively and quantitatively spray the powder 100 more appropriately.

In addition, an outer diameter of the roller 4 is not particularly limited, but is preferably, for example, 30 mm or more and 1000 mm or less, and is more preferably 50 mm or more and 800 mm or less.

The roller 4 may have, for example, a configuration as illustrated in FIG. 2 or a configuration as illustrated in FIG. 3. In the configuration illustrated in FIG. 2, the roller 4 has a core portion 41 and a net-like cylinder 42 into which the core portion 41 is inserted. The core portion 41 has a column shape. In addition, the net-like cylinder 42 is a mesh member having a cylindrical shape.

The net-like cylinder 42 may have a configuration in which linear objects are knitted or may have a configuration like punched metal in which a large number of through-holes are formed. In such a configuration, by appropriately setting a wire diameter, an aperture, an aperture ratio, and the like of a mesh, it is possible to set the surface roughness Rz to an appropriate value. Furthermore, by preparing a plurality of the net-like cylinders 42 having a different mesh roughness and replacing the net-like cylinders 42, the surface roughness can be easily adjusted.

In the configuration illustrated in FIG. 3, a plurality of protrusions 43 and recesses 44 extending in a longitudinal direction of the roller 4 is formed. The protrusions 43 and the recesses 44 are alternately disposed in a circumferential direction of the roller 4 at equal intervals.

In such a configuration, by appropriately setting the pitch or the like of the protrusions 43 and the recesses 44, it is possible to set the surface roughness Rz to an appropriate value. Note that a configuration may be adopted in which the protrusions 43 and the recesses 44 are disposed in a checkered pattern on the outer peripheral surface of the roller 4.

Note that the roller 4 is not limited to the above described configurations. For example, a configuration in which the outer peripheral surface of the roller 4 is embossed, or in which a plurality of grooves is provided in the longitudinal direction of the roller 4, may be adopted.

The doctor blade 24 is an elongated rectangular plate-shaped member and extends from a lower end on a right side of the side wall portion 211, that is, a downstream lower end in the transfer direction of the powder 100, toward the discharge port 23. The doctor blade 24 is provided such that an end portion 241 adjacent to the discharge port faces the outer peripheral surface of the roller 4 in the longitudinal direction of the roller 4. The powder 100 adhering to the outer peripheral surface of the roller 4 is transferred downstream by the rotation of the roller 4 and is scraped off by the doctor blade 24 in constant amounts. After passing the doctor blade 24, the scraped-off powder 100 drops from the powder supply device 1 due to gravity and is supplied to the object outside the powder supply device 1.

The end portion 241 of the doctor blade 24 faces the outer peripheral surface of the roller 4 below the central axis O of the roller 4. As a result, since the powder 100 that has been scraped off by the doctor blade 24 immediately drops, the powder 100 can be quantitatively supplied to a target position.

The partition member 31 is a rectangular plate-shaped member that is substantially horizontally fixed inside the storage tank 21. End portions of three of four sides constituting an outer periphery of the partition member 31 are fixed to inner surfaces of the side wall portion 211, and the end portion 311 of another side is separated from the side wall portion 211. Therefore, an opening 32 that is in communication with upper and lower spaces of the partition member 31 is formed between the end portion 311 and the side wall portion 211. In other words, in the internal space 210 of the storage tank 21, when a space above the partition member 31, in which the lid portion 212 is disposed, is a first chamber 210A, and a space below the partition member 31, in which the doctor blade 24 is disposed, is a second chamber 210B, the first chamber 210A and the second chamber 210B are in communication with each other via the opening 32. In this way, the partition member 31 is provided between the first chamber 210A and the second chamber 210B, separates the first chamber 210A and the second chamber 210B from each other, and restricts the width of the opening 32 through which the first chamber 210A and the second chamber 210B are in communication with each other.

The powder 100 is charged into the first chamber 210A through an opening by opening the lid portion 212. The powder 100 charged into the first chamber 210A moves to the second chamber 210B through the opening 32 due to stirring by the stirring unit 22 and gravity. In the present embodiment, the opening 32 is provided so as not to be aligned with the doctor blade 24 in a vertical direction. That is, a configuration in which the opening 32 is provided toward the left in the storage tank 21, that is, upstream in the direction in which the powder 100 is transferred by the roller 4, is adopted, and the powder 100 that drops from the opening 32 to the second chamber 210B does not drop directly onto the doctor blade 24.

After dropping through the opening 32 and being stored in the second chamber 210B, the powder 100 adheres to the outer peripheral surface of the roller 4 provided at the bottom of the second chamber 210B and is transferred downstream by rotation of the roller 4. Then, the powder 100 is scraped off by the doctor blade 24 in constant amounts and drops onto the target Note that although the opening 32 is formed between the end portion 311 of the plate-shaped partition member 31 and the side wall portion 211, a configuration may be adopted in which the four sides of the partition member 31 are fixed to the inner surfaces of the side wall portion and one or more holes are made in the partition member 31.

As described above, the powder supply device 1 of the present embodiment is partitioned, by the partition member 31 provided in the internal space 210 of the storage tank 21, into the first chamber 210A, into which the powder 100 is charged, and the second chamber 210B, in which the doctor blade 24 is disposed. Then, the powder 100 that is charged into the first chamber 210A moves to the second chamber 210B through the opening 32, is scraped off by the doctor blade 24 provided at the discharge port 23 in constant amounts, and then drops to the object below the powder supply device 1. In this way, since the width of the opening 32 is restricted by the partition member 31, the amount of the powder 100 stored in the second chamber 210B, which is a space near the doctor blade 24, decreases compared to a case where the partition member 31 is not provided. As a result, a load imposed on the doctor blade 24 by the powder 100 is reduced, and thus a problem in the related art such as curving of the doctor blade 24 is unlikely to occur, and it is thereby possible to quantitatively supply the powder 100 more appropriately.

In addition, in the powder supply device 1 of the present embodiment, since the partition member 31 is a plate-shaped member, the powder supply device 1 can be reduced in size, and the internal space 210 can be partitioned with a simple design.

Second Embodiment

Figure 4:
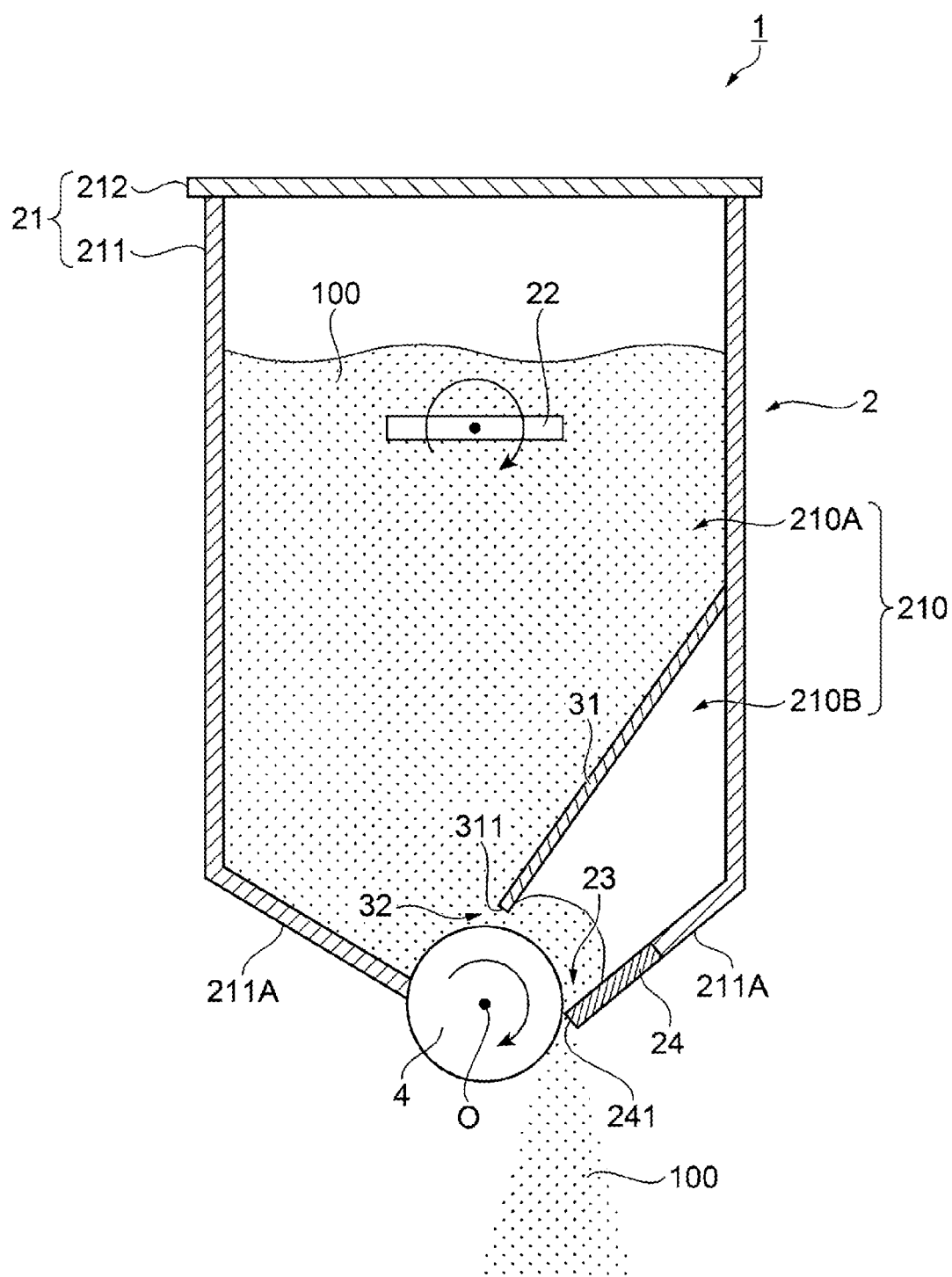
FIG. 4 is a sectional view of a powder supply device according to a second embodiment.
Figure 5:
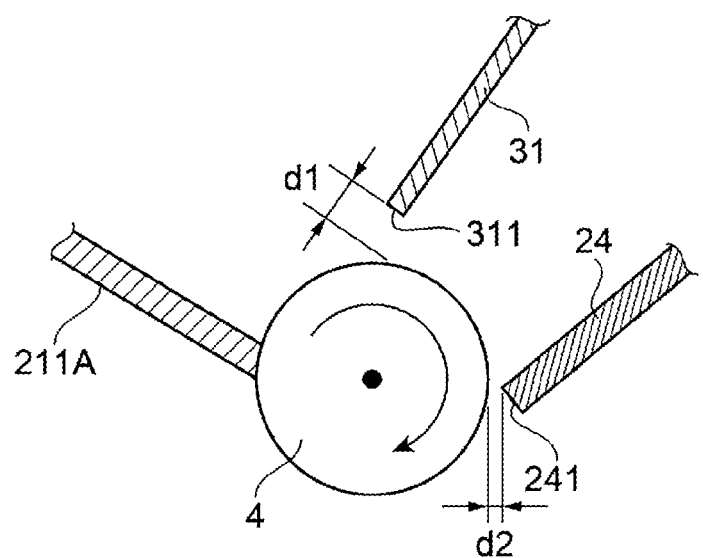
FIG. 5 is a partial enlarged view of the powder supply device according to the second embodiment.

FIG. 4 is a sectional view of a powder supply device according to a second embodiment. FIG. 5 is a partial enlarged view of the powder supply device according to the second embodiment. In the following description, mainly differences from the first embodiment will be described, and description of similar matters will be omitted. Note that in FIGS. 4 and 5, configurations similar to those of the first embodiment are denoted by the same reference numerals.

Similarly to the first embodiment, the partition member 31 serving as a restricting portion is a rectangular plate-shaped member, but in the present embodiment, the partition member 31 is disposed so as to be vertically inclined. An end portion that is an upper end of the partition member 31 is fixed to an inner surface, among inner surfaces of the side wall portion 211, downstream in the transfer direction of the powder 100. On the other hand, the end portion 311 that is a lower end of the partition member 31 faces, in the longitudinal direction of the roller 4, the outer peripheral surface of the roller 4 across a gap. The partition member 31 partitions the internal space 210 into the first chamber 210A, in which the powder 100 charged from above the powder supply device 1 is stored, and the second chamber 210B, in which the doctor blade 24 is disposed. In addition, the gap between the end portion 311 and the roller 4 is the opening 32, and the first chamber 210A and the second chamber 210B are in communication with each other via the opening 32. In the present embodiment, the roller 4 is disposed to face both the bottom of the first chamber 210A and the bottom of the second chamber 210B.

According to the second embodiment, the same effects as the first embodiment can be obtained. Furthermore, in the opening 32 between the end portion 311 and the roller 4, the powder 100 adhering to the roller 4 is scraped off. As a result, the amount of powder to be stored in the second chamber 210B can be further reduced, and it is possible to quantitatively supply the powder 100 more appropriately.

In addition, as illustrated in FIG. 5, a relation between a distance d1 from the end portion 311 to the outer peripheral surface of the roller 4 and a distance d2 from the end portion 241 of the doctor blade 24 to the outer peripheral surface of the roller 4 is preferably d1>d2. According to the relation, since the amount of the powder 100 conveyed to the second chamber 210B from the first chamber 210A is larger than the amount of the powder 100 discharged from the second chamber 210B to the outside, the powder 100 is more efficiently supplied.

Third Embodiment

Figure 6:
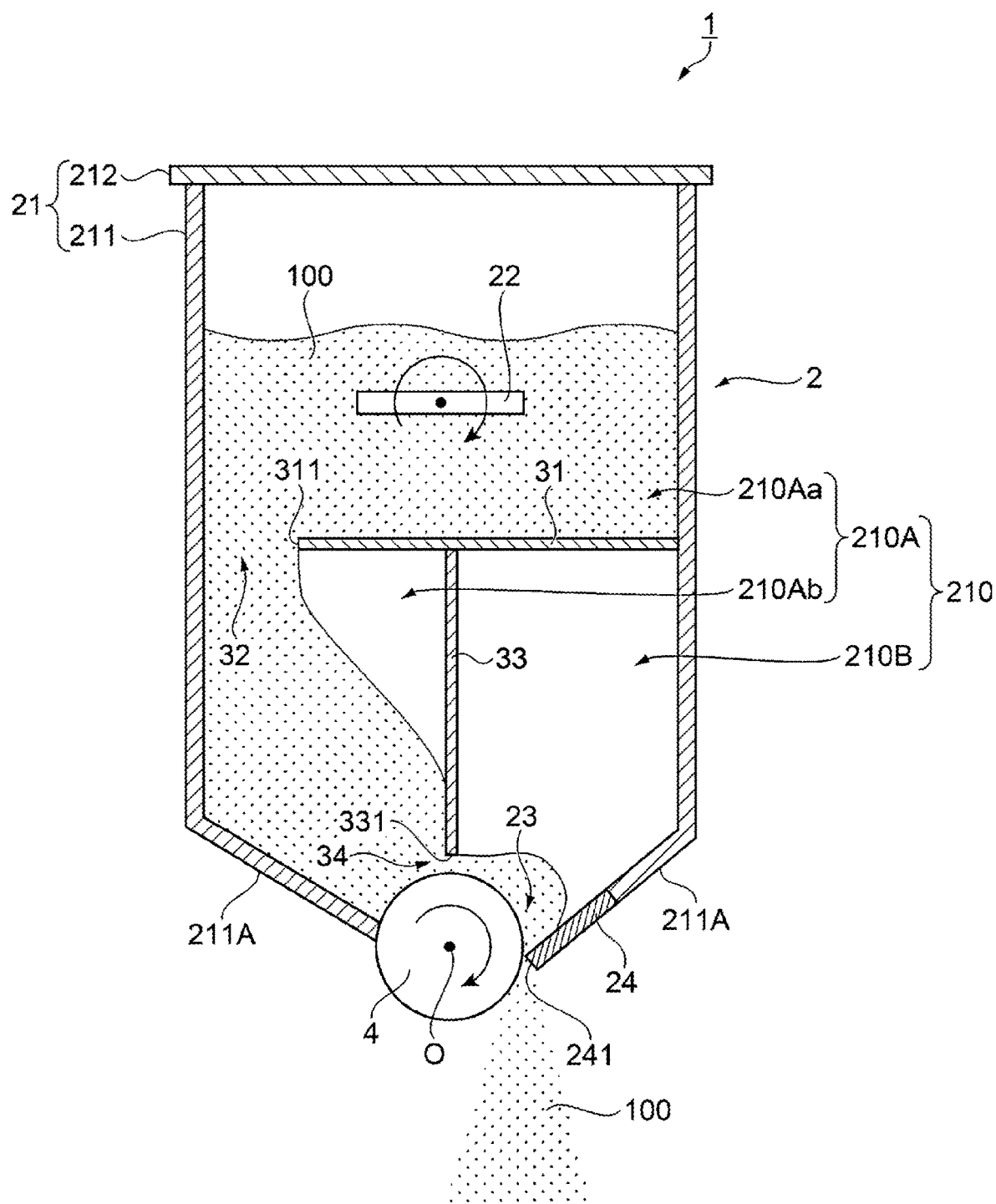
FIG. 6 is a sectional view of a powder supply device according to a third embodiment.

FIG. 6 is a sectional view of a powder supply device according to a third embodiment of the present disclosure. In the following description, mainly differences from the first embodiment will be described, and description of similar matters will be omitted. Note that in FIG. 6, configurations similar to those of the first embodiment are denoted by the same reference numerals.

In the powder supply device 1 of the present embodiment, the partition member 31 similar to that of the first embodiment is substantially horizontally disposed in the internal space 210. In addition, on a lower surface of the partition member 31, a partition member 33 serving as a restricting portion is substantially orthogonally disposed. The partition member 33 is a rectangular plate-shaped member, and an end portion 331 that is an end portion of the partition member 33 faces, in the longitudinal direction of the roller 4, the outer peripheral surface of the roller 4 across an opening 34, which is a gap. The internal space 210 is partitioned into three spaces by the partition members 31 and 33. Among the spaces, a space 210Aa above the partition member 31 and a space 210Ab below the partition member 31 and upstream of the partition member 33 in the transfer direction of the powder 100 correspond to the first chamber 210A. Furthermore, a space below the partition member 31 and downstream of the partition member 33 in the transfer direction of the powder 100, that is, a space in which the doctor blade 24 is disposed, corresponds to the second chamber 210B. In other words, the first chamber 210A and the second chamber 210B are separated by the partition members 31 and 33 and are in communication with each other via the opening 34, whose width is restricted by the partition member 33. In the present embodiment, the roller 4 is disposed to face both the bottom of the space 210Ab of the first chamber 210A and the bottom of the second chamber 210B.

In the present embodiment, the powder 100 charged from above is first stored in the space 210Aa located on an upper side of the first chamber 210A. Thereafter, the powder 100 passes through the opening 32, drops to the space 210Ab, adheres to the outer peripheral surface of the roller 4, and is transferred to the second chamber 210B. At this time, the powder 100 passes through the opening 34 while being scraped off by the partition member 33. After passing through the opening 34, the powder 100 is further scraped off by the doctor blade 24 and drops onto the target below the powder supply device 1.

According to the third embodiment, the same effects as the first embodiment can be obtained. Furthermore, the first chamber 210A in the internal space 210 of the storage tank 21 is divided into the space 210Aa and the space 210Ab, the amount of the powder 100 in the second chamber 210B, in which the doctor blade 24 is disposed, can be further reduced, and it is possible to quantitatively supply the powder 100 more appropriately.

As described above, although the powder supply device of the present disclosure has been described with respect to the illustrated embodiments, the present disclosure is not limited thereto, and each unit constituting the powder supply device can be replaced with that of any configuration capable of performing a similar function.

In the above embodiments, although a gap is provided between the roller 4 and the doctor blade 24, the doctor blade 24 may be disposed so that the end portion 241 is in contact with a protrusion of the outer peripheral surface of the roller 4. In other words, d2=0 may hold.

Furthermore, in the above embodiments, although a configuration in which the plate-shaped partition members 31 and 33 serving as restricting portions are provided has been described, a restricting portion of the present disclosure is not limited to a plate-shaped member. For example, the width of the opening 32 may be restricted by narrowing part of the side wall portion 211 of the storage tank 21. Furthermore, any appropriate component may be added.

Furthermore, use of the powder supply device 1 of the above embodiments is not limited to spraying powder over a sheet, and the powder supply device 1 is applicable to various applications such as quantitative supply of powder in a food manufacturing line.

What is claimed is:

1. A powder supply device comprising:
a storage tank in which an internal space that stores powder and a discharge port that discharges the powder from the internal space to outside are formed;
a roller that has an outer peripheral surface formed of a rough surface and is rotatably provided, in the discharge port, to face both the internal space and the outside; and
a doctor blade that is provided at the discharge port and faces the outer peripheral surface of the roller, wherein
the internal space includes a first chamber into which the powder is charged and a second chamber in which the doctor blade is disposed,
the first chamber communicates with the second chamber via an opening,
a restricting portion that restricts a width of the opening is provided between the first chamber and the second chamber,
the powder charged into the first chamber moves to the second chamber through the opening, and
the doctor blade faces the outer peripheral surface below a central axis of the roller.

2. A powder supply device comprising:
a storage tank in which an internal space that stores powder and a discharge port that discharges the powder from the internal space to outside are formed;
a roller that has an outer peripheral surface formed of a rough surface and is rotatably provided, in the discharge port, to face both the internal space and the outside; and
a doctor blade that is provided at the discharge port and faces the outer peripheral surface of the roller, wherein
the internal space includes a first chamber into which the powder is charged and a second chamber in which the doctor blade is disposed,
the first chamber communicates with the second chamber via an opening,
a restricting portion that restricts a width of the opening is provided between the first chamber and the second chamber,
the powder charged into the first chamber moves to the second chamber through the opening,
the restricting portion includes a partition member that separates the first chamber and the second chamber from each other, and
the partition member is a plate-shaped member having an end portion that faces the outer peripheral surface of the roller.

3. The powder supply device according to claim 2, wherein
an average particle diameter of the powder is 150 µm or more.

4. The powder supply device according to claim 2, wherein
the roller is provided at a bottom of the second chamber.

* * * * *